W. & I. COGSWELL.
Harvester.

No. 26,338.

Patented Dec. 6, 1859.

Witnesses:

Inventors:

UNITED STATES PATENT OFFICE.

WM. COGSWELL AND IRA COGSWELL, JR., OF OTTAWA, ILLINOIS.

IMPROVEMENT IN HARVESTERS.

Specification forming part of Letters Patent No. 26,338, dated December 6, 1859.

*To all whom it may concern:*

Be it known that we, W. COGSWELL and IRA COGSWELL, Jr., both of Ottawa, in the county of La Salle and State of Illinois, have invented a new and Improved Harvesting-Machine; and we do hereby declare that the following is a full, clear, and exact description of the same, reference being had to the annexed drawings, making a part of this specification, in which—

Figure 1:
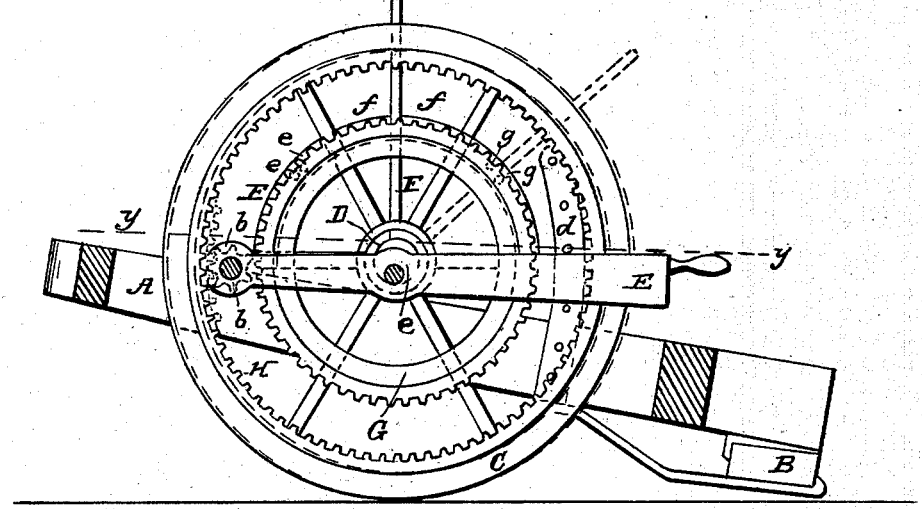
Figure 2:
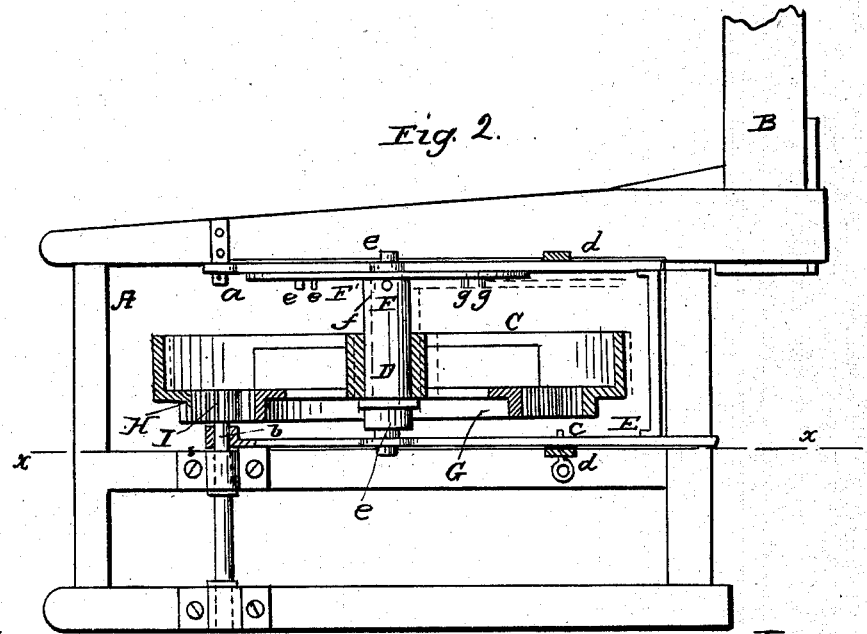

Figure 1 is a side sectional view of our invention. Fig. 2 is a horizontal section of the same.

Similar letters of reference indicate corresponding parts in the two figures.

To enable those skilled in the art to fully understand and construct our invention, we will proceed to describe it.

A represents the main frame of a harvester, and B the finger-bar attached thereto. The main frame may be of the ordinary rectangular form, as shown clearly in Fig. 2.

C is the driving-wheel, which is fitted loosely on its axle D, the latter being placed in a frame, E, the forward part of which is fitted loosely on a journal, $a$, and a shaft, $b$, the journal and shaft being in line with each other, as shown plainly in Fig. 2. The frame E is allowed to rise and fall freely in consequence of being fitted loosely on its journal and shaft, and it may be secured at any desired height within the scope of its movement by pins $c$, which pass through segment-bars $dd$, attached to the main frame.

The axle D of the driving-wheel C has its journals $e\ e$ formed eccentrically at its ends, said journals being fitted loosely in the frame E, so that they may turn therein.

To the axle D a lever, F, is attached, said lever being fitted between pins $ff$, $gg$, or $hh$ in a semicircular plate, F', attached to the main frame, said pins and lever securing the axle D in three different positions.

To the outer side of the driving-wheel C a toothed wheel, G, is attached concentrically, and a geared flange, H, is also attached concentrically to the outer side of the driving-wheel, the flange H being near the rim of the wheel.

On the inner end of the shaft $b$ a pinion, I, is placed, said pinion being fitted in the space between the geared flange H and wheel G, the diameter of the pinion being less than the width of the space between the geared flange H and wheel G.

From the above description it will be seen that the pinion I may be made to gear into either the flange H or wheel G by simply turning the axle D, the result being due to the eccentric journals $e\ e$ of the axle D, which journals shift the driving-wheel C as the axle is turned. It will also be seen that the pinion I may be made to fit between the geared flange and wheel so as not to be engaged with either, in the latter case the lever F being fitted between the pins $ff$, as shown in black, Fig. 1. When the pinion is in gear with the wheel H the lever F is fitted between the pins $e\ e$, and when in gear with the flange H it is fitted between the pins $g\ g$. When the pinion I is in gear with the wheel G, the shaft $b$, from which motion is communicated to the sickle, will rotate slower than when said pinion is in gear with the flange H, and consequently the speed of the sickle may be adapted for cutting either grass or grain, a quicker motion being required for cutting grass than is necessary for cutting grain. In cutting the latter the sickle is raised considerably higher than in cutting grass, and this adjustment of the sickle is effected by simply adjusting the frame E at a greater or less height by means of the pins $c\ c$ in the segment-bars $d\ d$.

Thus it will be seen that by a very simple means the sickle may be adapted for cutting either grass or grain, both as regards speed and its proper elevation from the surface of the ground.

What we claim as our invention, and desire to secure by Letters Patent, is—

The combination of the shifting pinion I with the eccentric axle D and adjusting-frame E, substantially as herein shown, so that by turning the said axle the pinion I will be thrown into gear with either of the concentric wheels C H, or out of gear with both, as desired, and so that the height of the main frame may be readily adjusted to correspond with the adjustment given the axle D and pinion I, as set forth.

WM. COGSWELL.
IRA COGSWELL, JR.

Witnesses:
C. A. MATHEWSON,
H. G. VORCE.